US012338962B1

(12) United States Patent
Garrett et al.

(10) Patent No.: US 12,338,962 B1
(45) **Date of Patent: *Jun. 24, 2025**

(54) MULTI-POSITIONAL BAR SHAPED LIGHT

(71) Applicant: Jem Accessories, Inc., Edison, NJ (US)

(72) Inventors: Jennifer Garrett, Rahway, NJ (US); Elie Chemtob, Eatontown, NJ (US)

(73) Assignee: Jem Accessories, Inc., Edison, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,735

(22) Filed: Apr. 28, 2023

Related U.S. Application Data

(63) Continuation of application No. 17/729,993, filed on Apr. 26, 2022, now Pat. No. 11,674,646, which is a continuation of application No. 17/208,873, filed on Mar. 22, 2021, now Pat. No. 11,326,749.

(60) Provisional application No. 62/992,456, filed on Mar. 20, 2020.

(51) Int. Cl.

| | |
|---|---|
| ***F21S 4/28*** | (2016.01) |
| ***F21V 17/12*** | (2006.01) |
| ***F21V 21/02*** | (2006.01) |
| ***F21V 21/10*** | (2006.01) |
| ***F21V 23/00*** | (2015.01) |
| ***F21V 27/00*** | (2006.01) |
| ***F21Y 103/10*** | (2016.01) |
| ***F21Y 115/10*** | (2016.01) |

(52) U.S. Cl.
CPC ................ *F21S 4/28* (2016.01); *F21V 17/12* (2013.01); *F21V 21/02* (2013.01); *F21V 21/10* (2013.01); *F21V 23/002* (2013.01); *F21V 27/00* (2013.01); *F21Y 2103/10* (2016.08); *F21Y 2115/10* (2016.08)

(58) Field of Classification Search
CPC .. F21S 4/28; F21V 17/12; F21V 21/02; F21V 21/10; F21V 23/002; F21V 27/00; F21Y 2103/10; F21Y 2115/10
See application file for complete search history.

(56) References Cited

U.S. PATENT DOCUMENTS 7,296,914 B1 * 11/2007 Russello ................ F21S 8/033 362/432

* cited by examiner

*Primary Examiner* — Jason M Han
(74) *Attorney, Agent, or Firm* — Goldberg Cohen LLP

(57) ABSTRACT

A multi-positional bar shaped light assembly includes a rear housing defining an interior and an open front. The housing further has a rear wall defining two identical sets of mounting holes therethrough, one at a midpoint of the housing and a second set at one end of the housing. The second set being oriented at a right angle with respect to the first set. A printed circuit assembly is mounted within the rear housing and includes a plurality of linearly aligned light emitting diodes arranged thereon oriented to emit light through the open front of the rear housing. A reflector has an open back and is mounted to the printed circuit assembly, and a translucent lens is attached to the rear housing at the open front. A support stand is affixed to the rear housing at one of the first and second sets of mounting holes.

20 Claims, 16 Drawing Sheets

MULTI-POSITIONAL BAR SHAPED LIGHT

BACKGROUND OF THE INVENTION

Lighting has always been a necessity of everyday life. Throughout history, mankind has desired to illuminate the dark. Wood fires built on the ground, candles, oil lamps, gas lamps and others have been an evolutionary progression through the ages. With the advent of electricity and the invention of the incandescent light bulb in the late 19th century our quest for perpetual light was solved. Mankind no longer needed to stumble in the dark with the introduction of a variety of incandescent lighting devices.

Other than the introduction of neon and fluorescent lighting, innovation in the lighting world largely revolved around various applications of the incandescent light. Colored lights were the result of using colored glass for the bulb or of a colored coating to the lightbulb. However, the use of incandescent lightbulbs was limited by their relatively inefficient use of electricity resulting in a significantly high thermal signature. Incandescent lights were thus typically relegated to provide white light for general usage. For the most part, decorative lighting was limited to strings of incandescent lights, either white or colored, placed where the heat signature was of minimal consequence.

The latter part of the 20th century and early 21st century saw the development and introduction the light-emitting diode (LED). An LED is much more efficient in its usage of electricity thus reducing its size and thermal signature relative to an incandescent light and is thus more adaptable to a variety of applications. We have now seen the incandescent light bulb being replaced by the LED light bulb and with the ability of LEDs to now emit a variety of colors their use has penetrated almost every aspect of everyday life. The efficiency and low cost of LEDs now make possible lighting devices which are affordable to both purchase and operate and are readily adaptable for decorative purposes.

SUMMARY OF THE INVENTION

In accordance with the invention, a multi-positional bar shaped light assembly comprises a rear elongate housing having a width greater than a height. The housing defines an interior and an open front, and further has a rear wall defining two identical sets of mounting holes therethrough, a first set at a midpoint of the rear housing width and a second set at one end of the rear housing at a midpoint of the rear housing height. The second set is oriented at a right angle with respect to the first set. A light emitting assembly is positioned and mounted within the rear housing and oriented to emit light through the open front of the rear housing. A support stand is affixed to the rear housing at one of the first and second sets of mounting holes.

In another aspect, the support stand includes a support base having a planar bottom surface and a stand support affixed to an opposite surface thereto, the support base and the support base are arranged at right angles one to the other. The stand support further defines a set of holes in a pattern identical to the first and second set of mounting holes defined in the rear elongate housing.

In a further aspect, the elongate housing is horizontally oriented when the support stand is affixed to the elongate housing utilizing the first set of mounting holes.

In an additional aspect, the elongate housing is vertically oriented when the support stand is affixed to the elongate housing using the second set of mounting holes.

In yet another aspect, the elongate housing further defines a cord recess formed therein such that an electrical cord providing electrical power to the light assembly is received in the cord recess and positionally maintained in the cord recess by the stand support structure.

In still a further aspect, the stand support is affixed to the elongate housing utilizing threaded fasteners.

In still another aspect, the housing further includes nuts embedded in the housing structure and in line with the mounting holes for receiving the threaded fasteners to secure the elongate housing to the support stand.

In a further aspect, the support base defines at least one hole therethrough, the hole for facilitating attachment of the support stand to a selected one of a vertical wall surface and a ceiling surface.

In still a further aspect, the stand support further defines an aperture therethrough for passage of an electrical cord providing electrical power to the light assembly.

In yet another aspect, a multi-positional bar shaped light assembly comprises a rear elongate housing having a width greater than a height. The housing defines an interior and an open front. The housing further has a rear wall defining two identical sets of mounting holes therethrough, wherein a first set is positioned at a midpoint of the rear housing width and a second set at one end of the rear housing at a midpoint of the rear housing height. The second set is oriented at a right angle with respect to the first set. A printed circuit assembly is positioned and mounted within the rear housing and includes a plurality of light emitting diodes arranged thereon and oriented to emit light through the open front of the rear housing. An electrical power cord extends through the rear elongate housing at a midpoint thereof and is electrically connected to the printed circuit assembly. A translucent lens is attached to the rear housing at the open front. A support stand is affixed to the rear housing at one of the first and second sets of mounting holes. The support stand includes a support base having a planar bottom surface and a stand support affixed to an opposite surface thereto. The support base and the stand support are arranged at right angles one to the other. The stand support further defines a set of holes in a pattern identical to the first and second set of mounting holes in the rear elongate housing.

In another aspect, the elongate housing is horizontally oriented with respect to the support base when the support stand is affixed to the elongate housing utilizing the first set of mounting holes.

In still another aspect, the stand support further defines an aperture therethrough for passage of the electrical cord providing electrical power to the light assembly.

In yet another aspect, the elongate housing is vertically oriented with respect to the support base when the support stand is affixed to the elongate housing using the second set of mounting holes.

In a still further aspect, the elongate housing defines a cord recess formed therein such that the electrical cord providing electrical power to the light assembly is received in the cord recess and positionally maintained in the cord recess by the stand support structure.

In another aspect, the stand support is affixed to the elongate housing utilizing threaded fasteners.

In a yet a further aspect, the housing includes nuts embedded in the housing structure and in line with the mounting holes for receiving the threaded fasteners to secure the elongate housing to the support stand.

In an additional aspect, the support base defines at least one hole therethrough, the hole for facilitating attachment of the support stand to a selected one of a vertical wall surface and a ceiling surface.

In another aspect a multi-positional bar shaped light assembly comprises a rear elongate housing having a width greater than a height. The housing defines an interior and an open front and has a rear wall defining two identical sets of mounting holes therethrough, a first set at a midpoint of the rear housing width and a second set at one end of the rear housing at a midpoint of the rear housing height. The second set is oriented at a right angle with respect to the first set. A printed circuit assembly is positioned and mounted within the rear housing and includes a plurality of light emitting diodes arranged thereon and oriented to emit light through the open front of the rear housing. An electrical power cord extends through the rear elongate housing at a midpoint thereof and is electrically connected to the printed circuit assembly. A translucent lens is attached to the rear housing at the open front. A support stand is selectively affixed to the rear housing at one of the first and second sets of mounting holes wherein the support stand includes a support base having a planar bottom surface and a stand support affixed to an opposite surface thereto. The support base and the stand support are arranged at right angles one to the other. The rear housing, when affixed to the support stand utilizing the first set of mounting holes, assumes a first orientation, and the rear housing, when affixed to the support stand utilizing the second set of mounting holes, assumes a second orientation at a right angle with respect to the first orientation.

In an additional aspect, the elongate housing further defines a cord recess formed between a first and a second mounting holes of the second set of mounting holes such that the electrical cord providing electrical power to the light assembly is received in the cord recess and positionally maintained in the cord recess by the stand support structure when the support stand is affixed to the rear housing utilizing the second set of mounting holes.

In a further aspect the support base defines at least one hole therethrough, the hole for facilitating attachment of the support stand to a selected one of a vertical wall surface and a ceiling surface.

Further embodiments and features of the invention will become apparent in conjunction with the detailed description of the inventions and their preferred embodiments provided hereafter.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
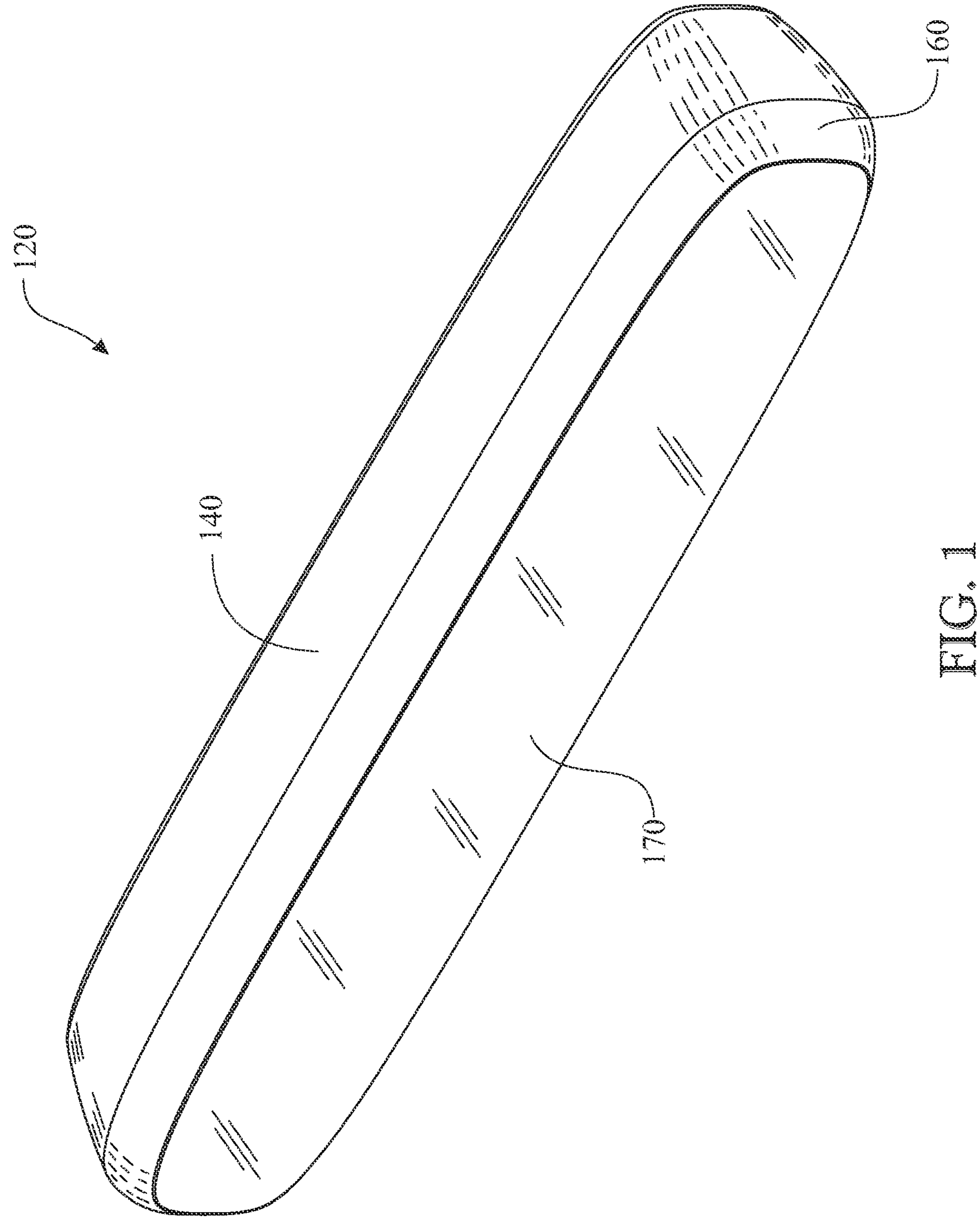
FIG. 1 presents an isometric top, left front view of a horizontally oriented bar shaped light.
Figure 2:
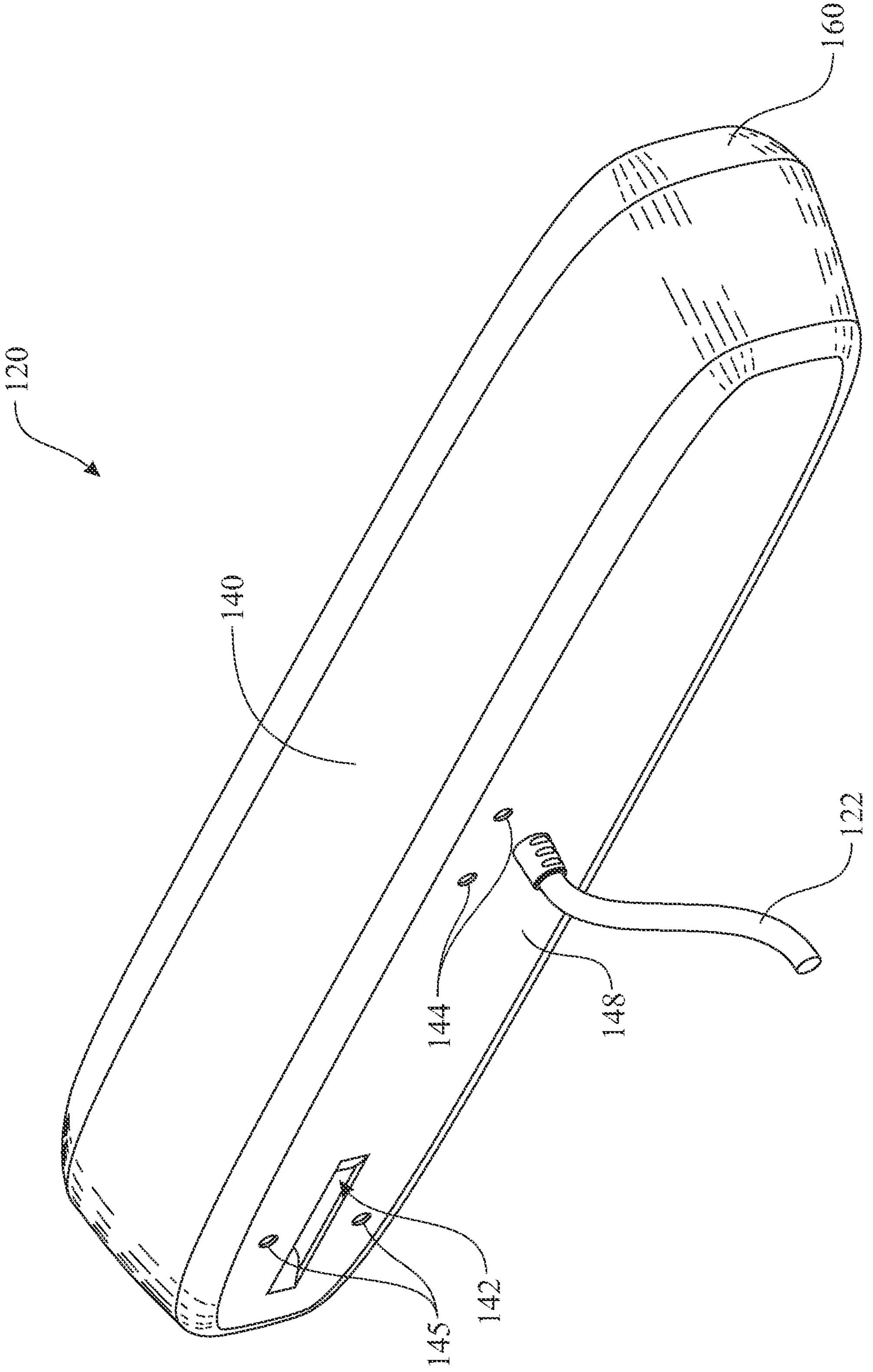
FIG. 2 presents an isometric top, right rear view of the horizontally oriented bar shaped light.
Figure 3:
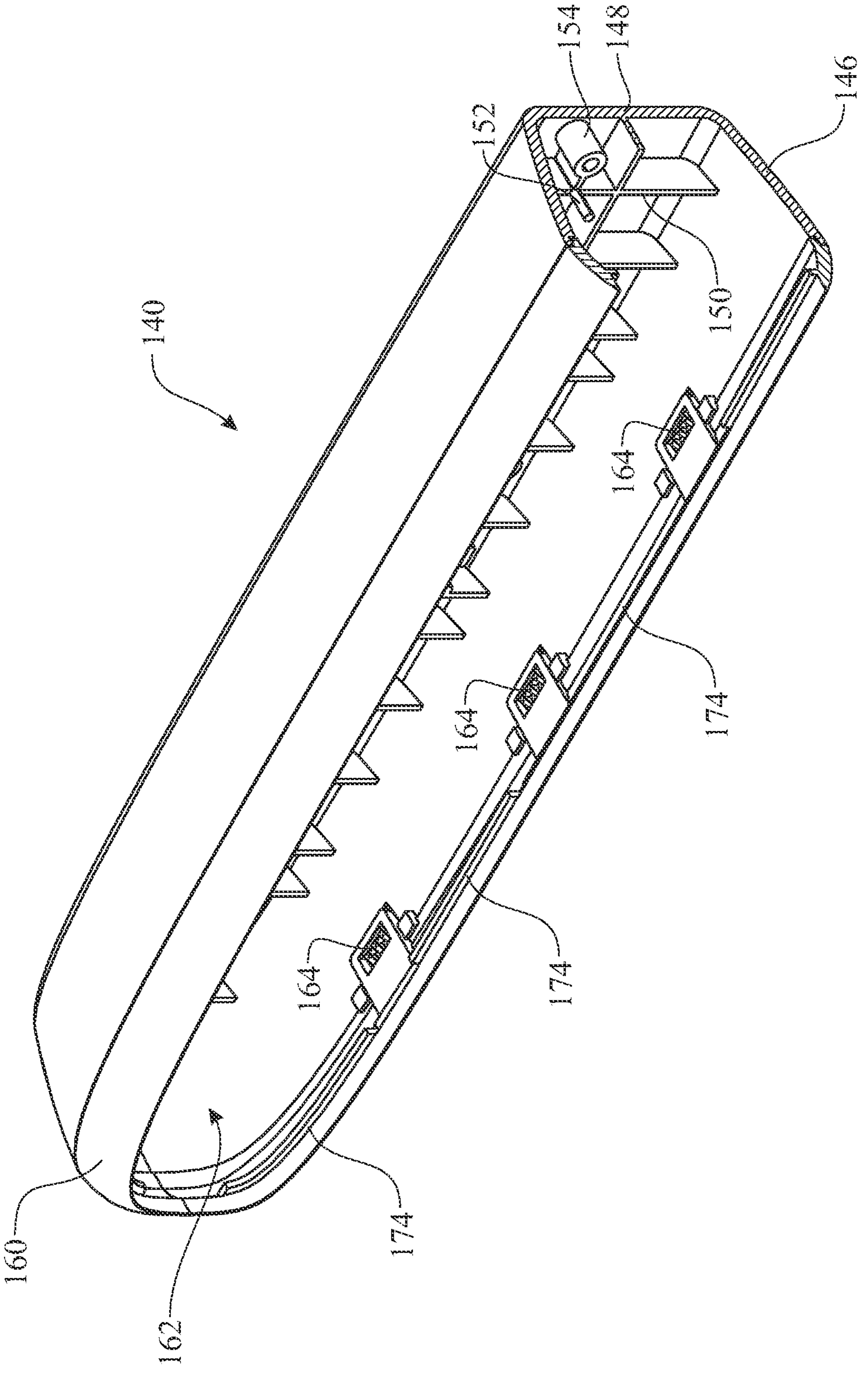
FIG. 3 presents an isometric top, left front view of the horizontally oriented bar shaped light housing with the front lens removed and the right end sectioned therefrom.
Figure 4:
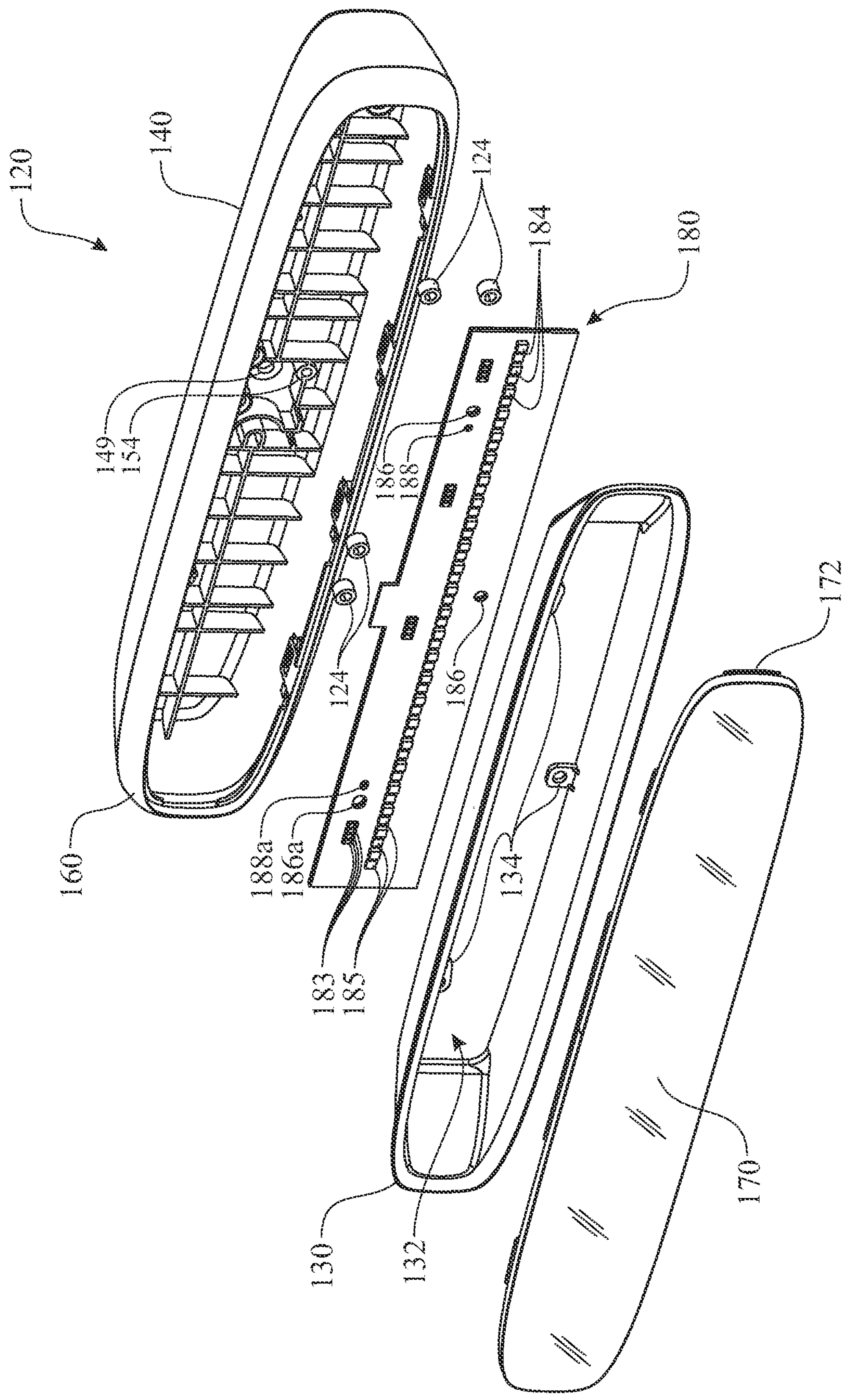
FIG. 4 presents a top, left front exploded view of the bar shaped light assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning now to the drawings, and in particular, FIGS. 1-7, wherein one embodiment of the invention presents an elongate bar shaped light assembly 120 having a rear housing 140 comprising a shell 146 having a width greater than a height and including a rear wall 148. A bezel 160 is affixed to a front portion of the rear housing 140 at a front periphery of the shell 146 utilizing the engagement of assembly tabs 164 to secure the bezel 160 to the rear housing 140. The bezel 160 defines an opening 162 into an interior of the rear housing 140. A translucent lens 170 is affixed to the bezel 160 whereby tabs 172 at a periphery of translucent lens 170 engage a lip 174 at opening 162 of the bezel 160.

Rear wall 148 of housing 140 defines therethrough a power cord aperture 149 through which power cord 122 passes to the interior of the rear housing 140. The rear wall 148 also defines a first set of horizontal mounting holes 144 at a lateral midpoint of the rear housing 140 for the attachment of a support stand 110 to support the light assembly 120 in a horizontal orientation. The rear wall 148 further defines a second set of mounting holes 145 oriented at a right angle to the first set of holes 144 to support the light assembly 120 in a vertical orientation. An interior portion of the housing 140 structure defining the mounting holes 144, 145 receives at each mount hole location a pem-nut 124 press fit therein. The housing 140 also includes in an interior thereof a plurality of ribs 150 affixed to the rear wall 148 and further defining a plurality of mounting holes 154 and locating pins 152 extending forwardly therefrom to facilitate the mounting of a printed circuit assembly 180. Ribs 150 provide a surface for supporting the printed circuit assembly 180 thereon.

Printed circuit assembly 180 includes a plurality of light emitting diodes (LEDs) 184, 185 thereon. The LEDs 184, 185 are oriented so that light emitted therefrom is directed through the front opening of the housing 140. The LEDs 184 are multi-color LEDs and the LEDs 185 are cool white LEDs to provide the user with a selectable range of whites and colors. The printed wiring assembly 180 further includes a plurality of resistors 183 connected in series with the LEDs 184, 185 to facilitate the proper functioning of the LEDs 184, 185. The printed circuit assembly 180 includes a plurality of mount holes 186, **186*a* wherein the hole 186*a* is slightly elongated to compensate for tolerance buildup. The mount holes 186, 186*a* correspond to the position of the mount holes 154 in the rear housing 140. In like manner, the printed circuit assembly 180 also defines alignment holes 188, 188*a* for the engagement of alignment pins 152 to ensure proper alignment of the printed circuit assembly 180 with respect to the mount holes 154. Alignment hole 188*a*** is also slightly elongated to compensate for tolerance buildup.

A reflector 130 defines a rear aperture 132 him is affixed over the printed circuit assembly 180 and defines a rear aperture 132 of sufficient size to permit light emanating from the LEDs 184, 185 to pass therethrough. The reflector 130 further includes mount tabs 134 which are positionally coincident with the mounting holes 154 in the interior of the housing 140. The reflector 130 and printed circuit assembly 180 are affixed within the rear housing 140 with screws 126 engaging the structure defining the mounting holes 154. The translucent lens 170 then attaches to the bezel 160 in the manner described above.

Figure 5:
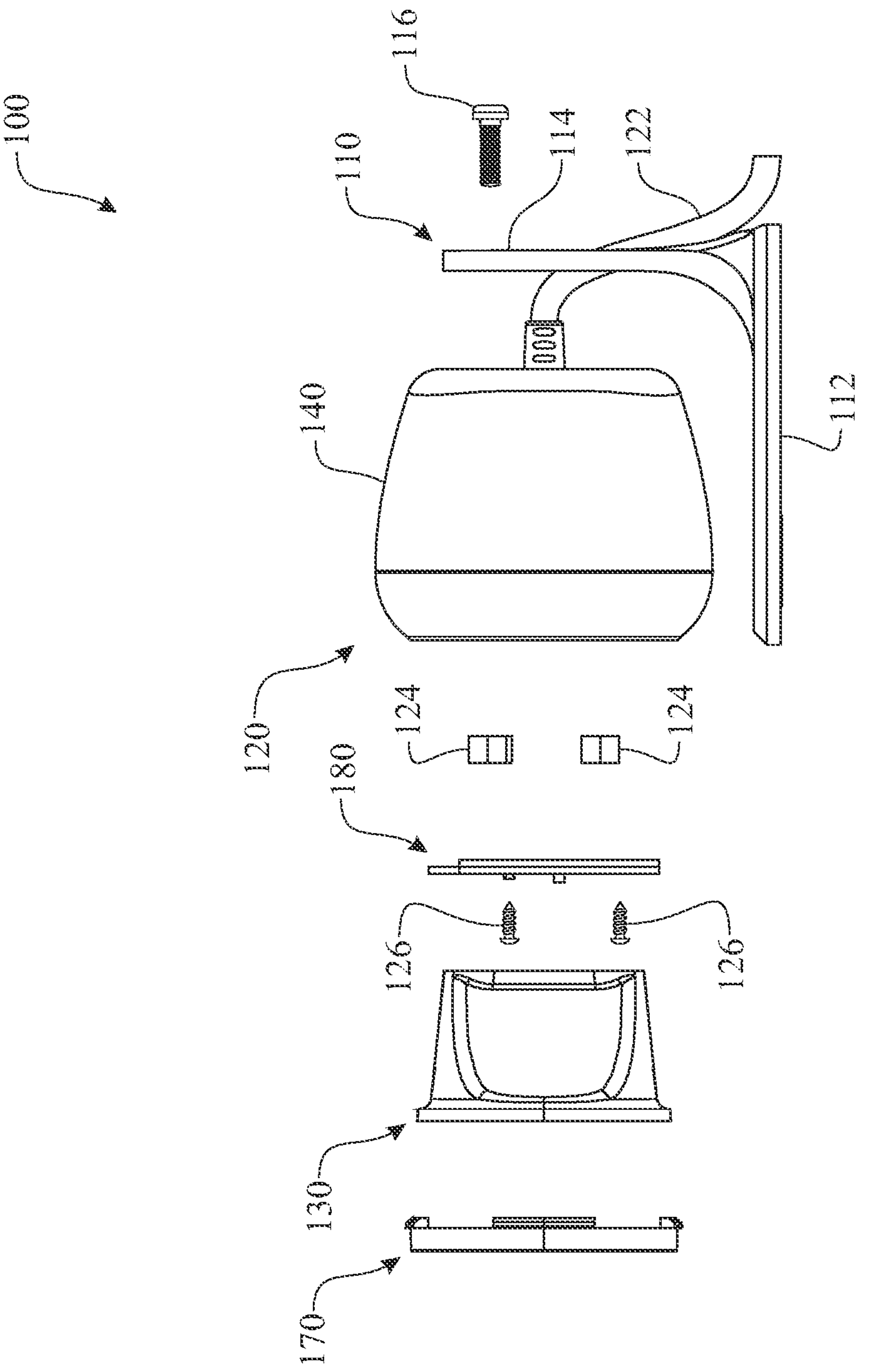
FIG. 5 presents an exploded left elevation view of the bar shaped light assembly with a supporting stand.
Figure 6:
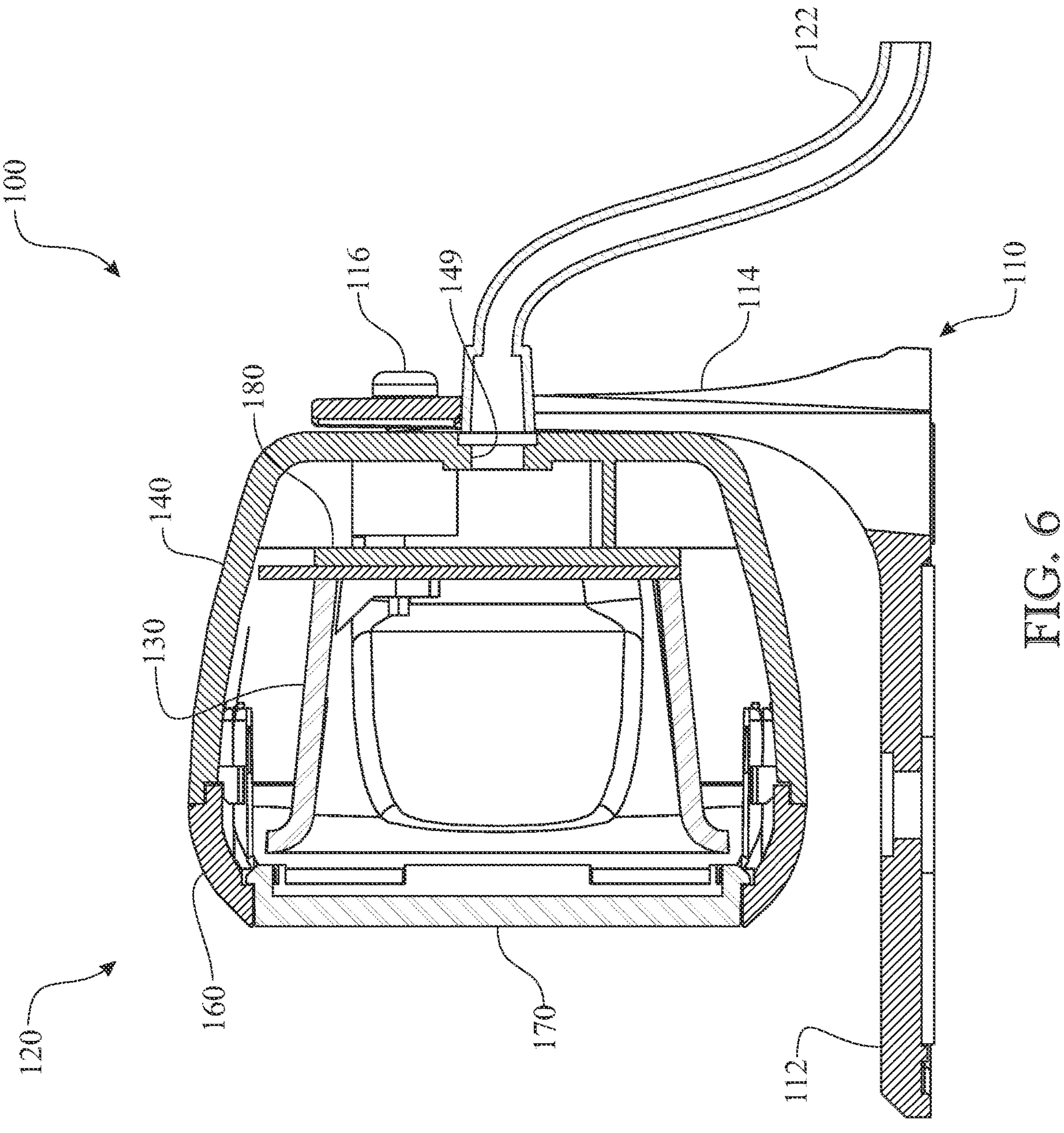
FIG. 6 presents a left elevation view of the bar shaped light assembly and attached supporting stand sectioned at a midpoint of the bar shaped light.
Figure 7:
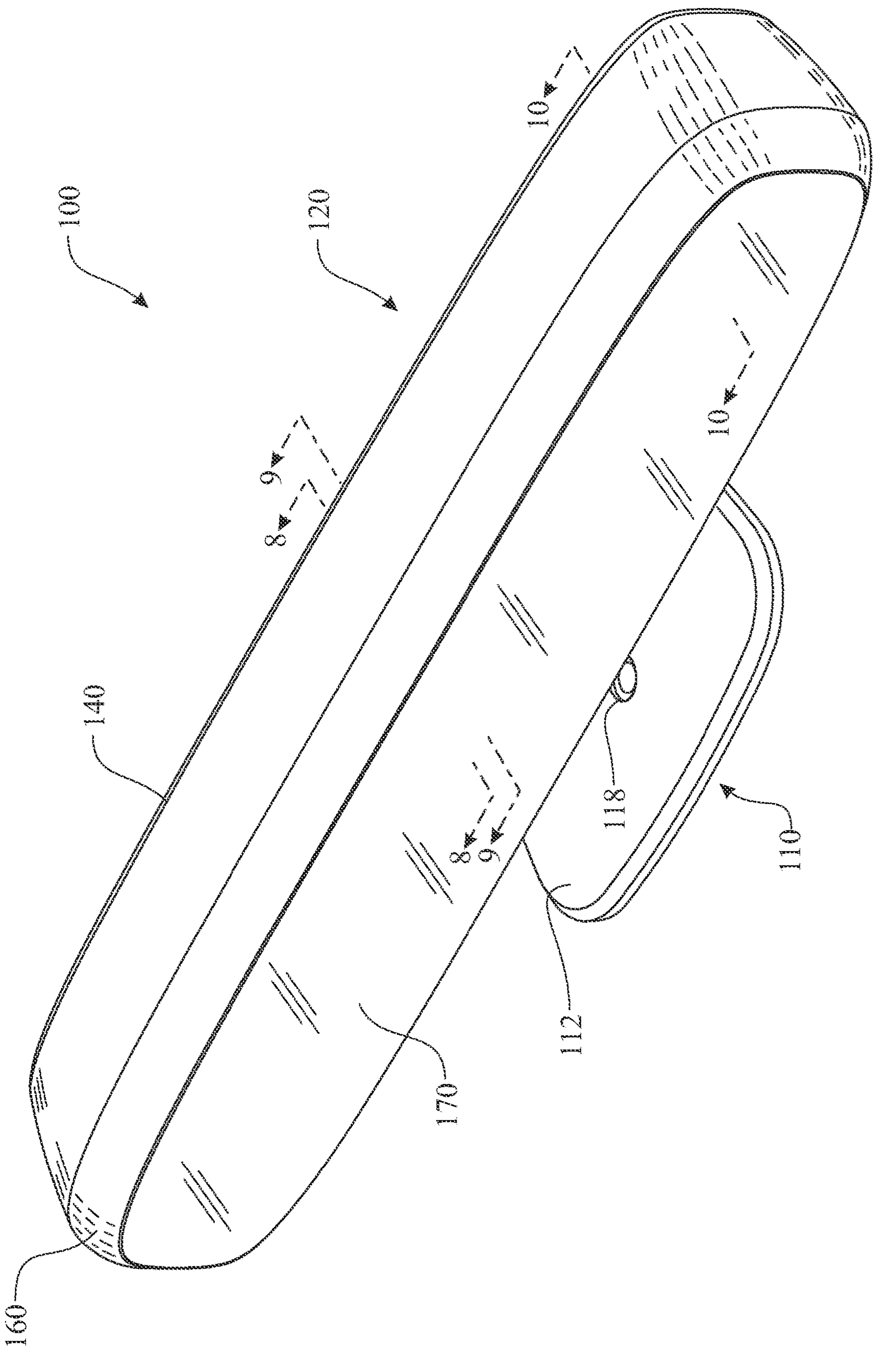
FIG. 7 presents an isometric top, left front sectional view of the horizontally oriented bar shaped light assembly taken along the line 7-7 of FIG. 10.

As illustrated in FIGS. 5-7, a support stand 110, comprising a stand base 112 and a stand support 114, can be attached to the bar shaped light assembly 120 at mounting holes 144 defined in the rear wall 148 of the housing 140 utilizing screws 116 to support the bar shaped light assembly 120 in a horizontal orientation. The support stand 110 extends under the light assembly 120 to prevent it from tipping while resting on a horizontal surface. Alternatively, the stand base 112 can be affixed to a vertical wall utilizing a fastener (not shown) extending through mount hole 118 defined by the stand base 112. A wall mounting provides the user with an additional light orientation to fit the needs of the user.

Figure 8:
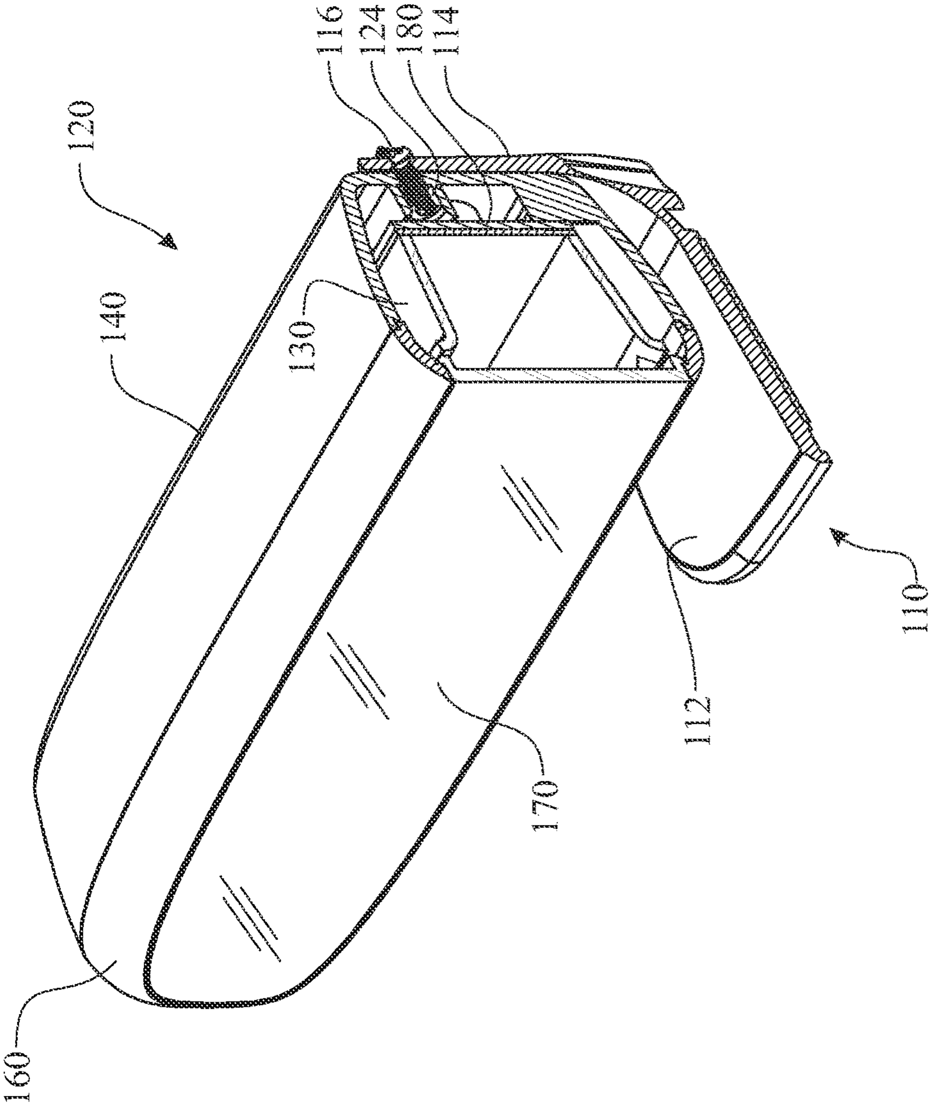
FIG. 8 presents an isometric top, left front sectional view of the horizontally oriented bar shaped light assembly taken along the line 8-8 of FIG. 10.

FIG. 8 provides a cross-sectional view of the light assembly 120 and the support stand 110 illustrating a screw 116 fastening the stand support 114 to the rear housing 140. The screw 116 extends through the stand support 114 to engage the pem-nut 124 which has been press fit into the structure of the rear housing 140.

Figure 9:
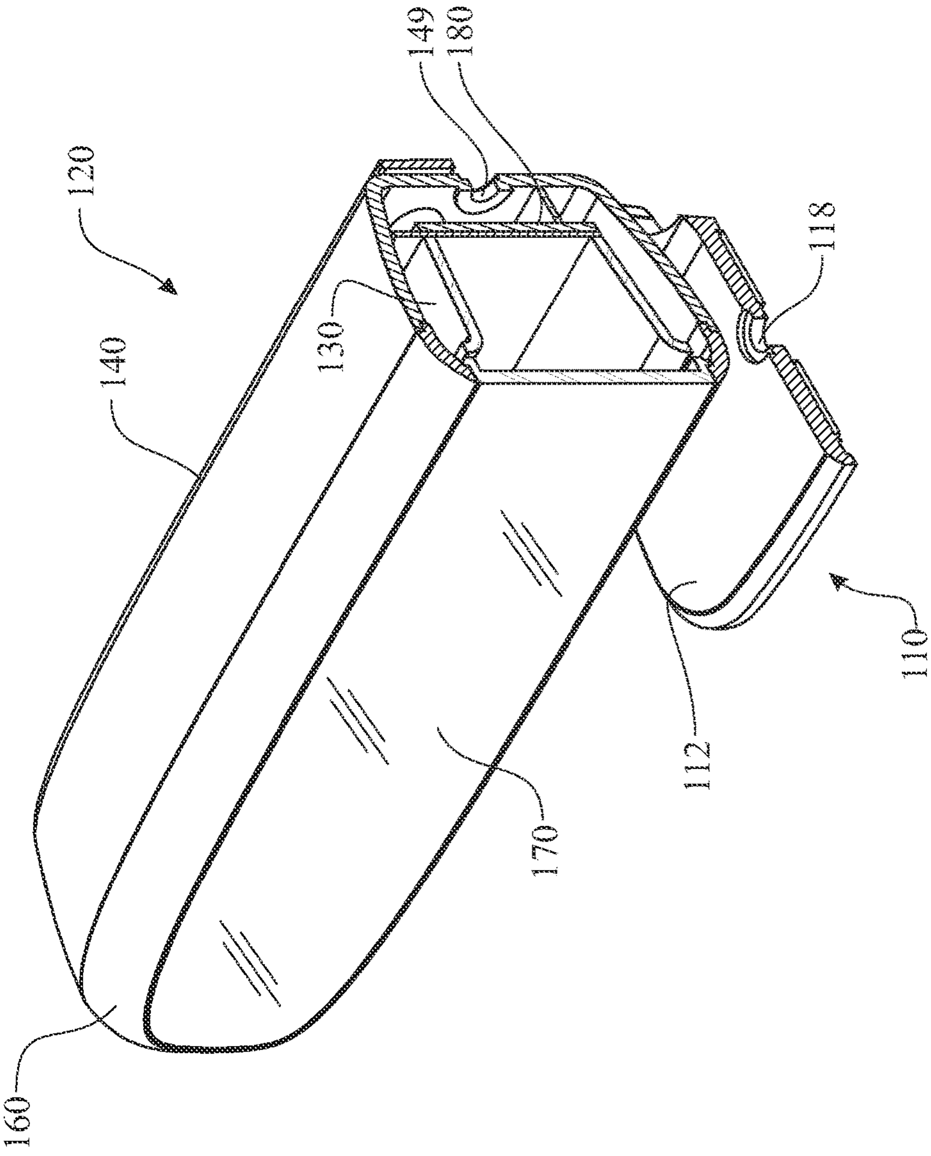
FIG. 9 presents an isometric top, left front sectional view of the horizontally oriented bar shaped light assembly taken along the line 9-9 of FIG. 10.

FIG. 9 provides a cross-sectional view of the light assembly 120 and support stand 110 illustrating the positioning of the cord aperture 149 proximate to the printed circuit assembly 184 termination of the electrical leads from power cord 120 (not shown) to the respective connections on the printed circuit assembly 180 for the proper functioning of the light assembly 120.

Figure 10:
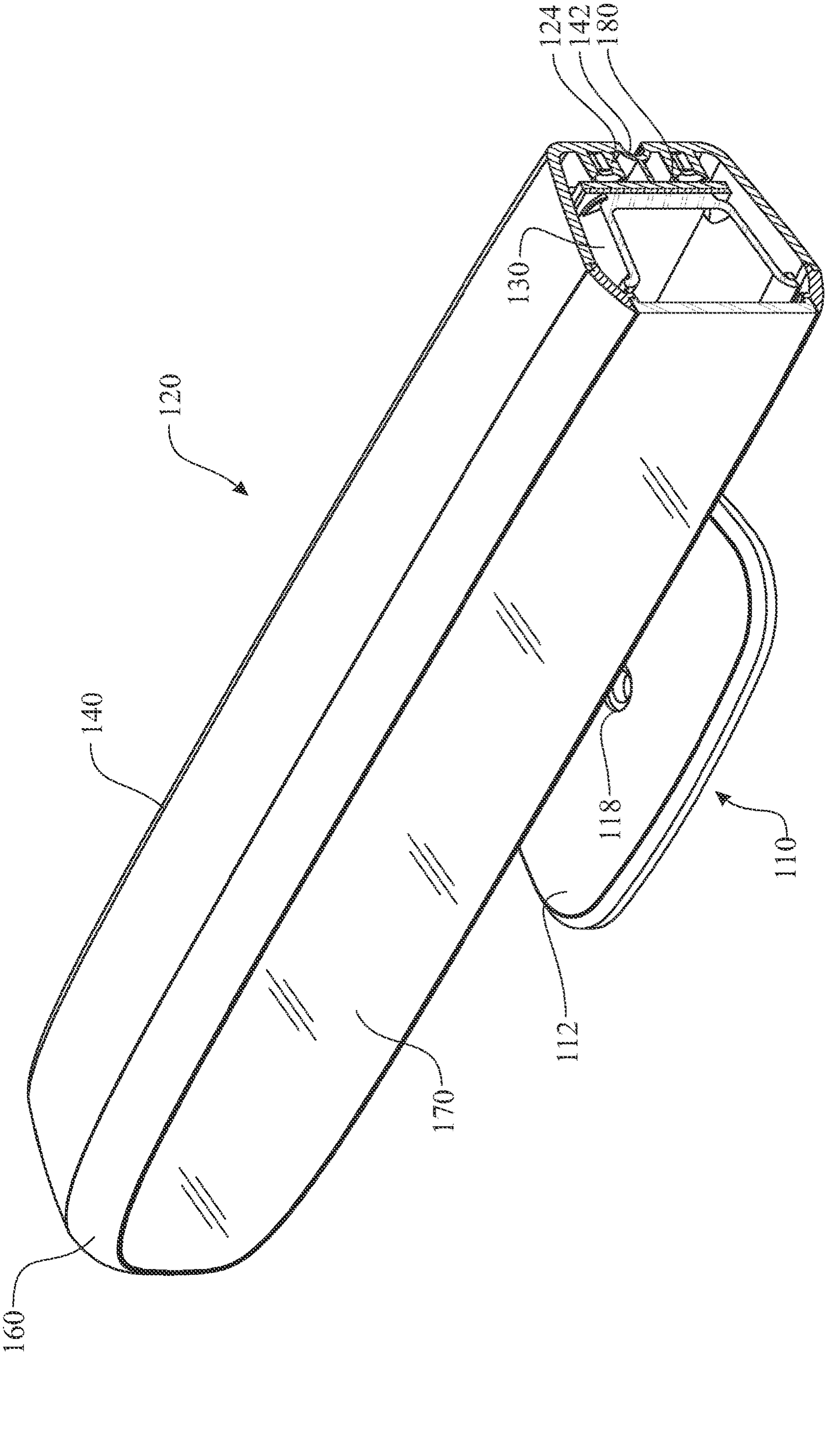
FIG. 10 presents an isometric top, left front view of the horizontally oriented bar shaped light assembly with its attached support stand.
Figure 13:
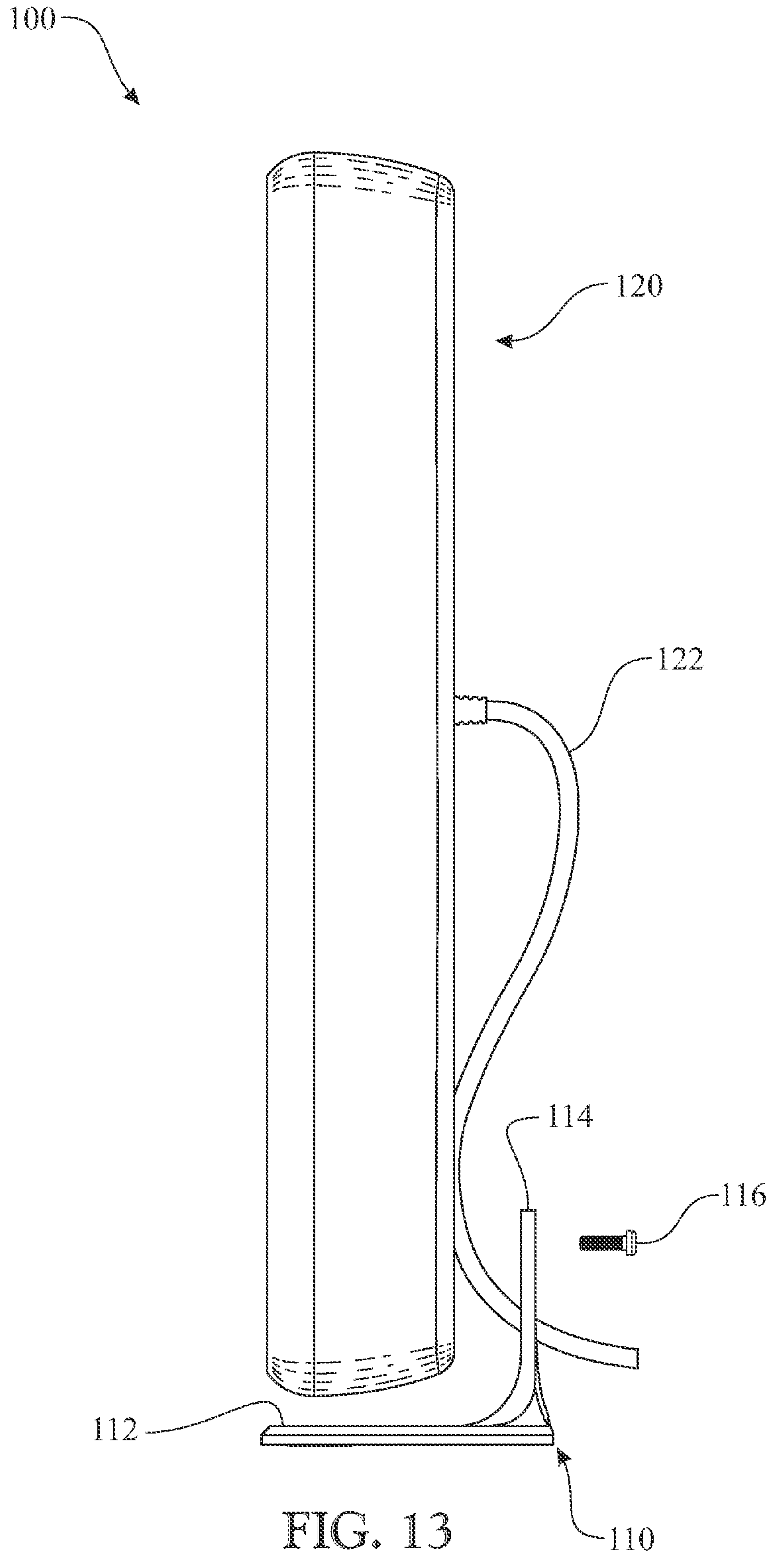
FIG. 13 presents a partially exploded right elevation view of the bar shaped light assembly in a vertical orientation and the support stand.
Figure 14:
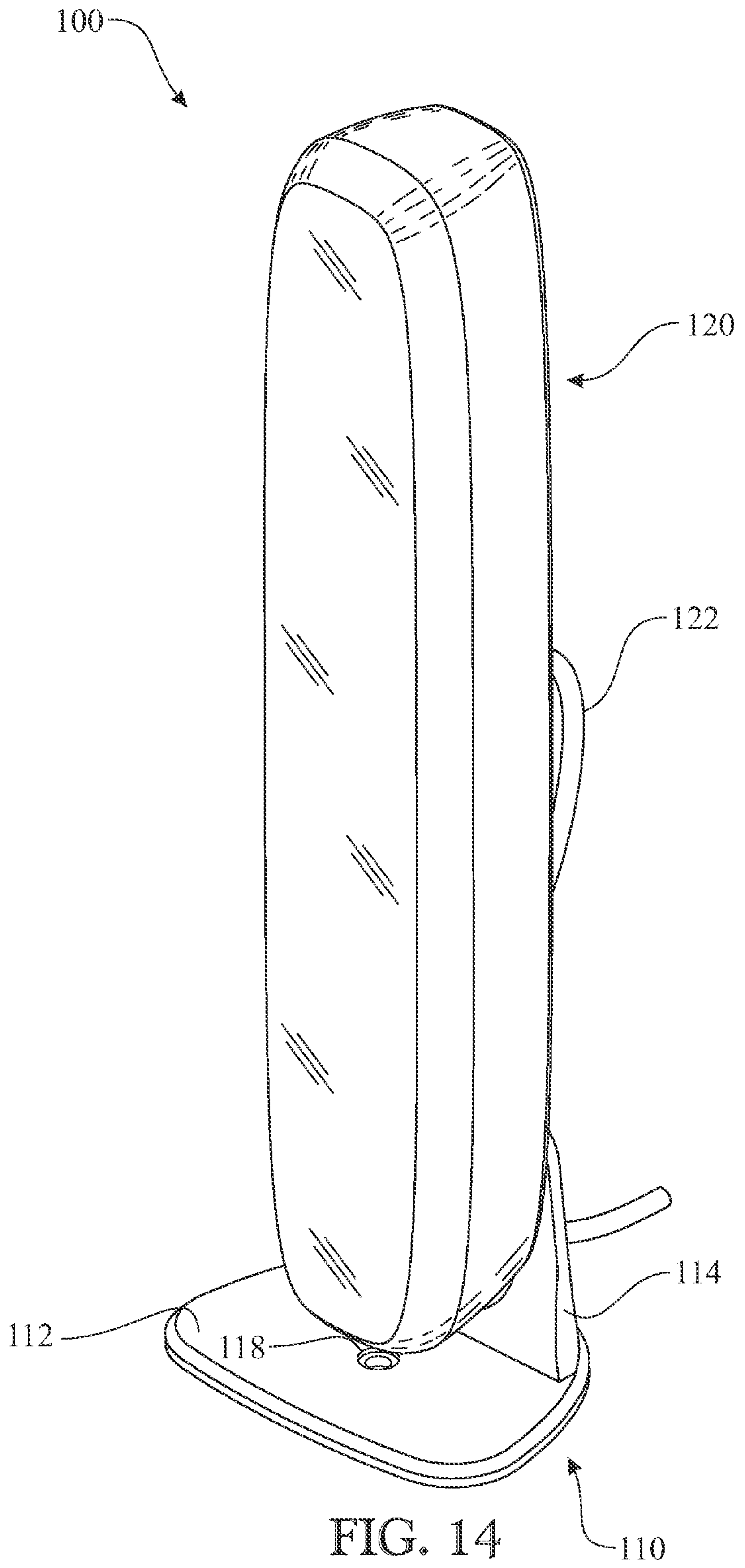
FIG. 14 presents a top, left front view of the vertically oriented bar shaped light assembly with its attached support stand.
Figure 15:
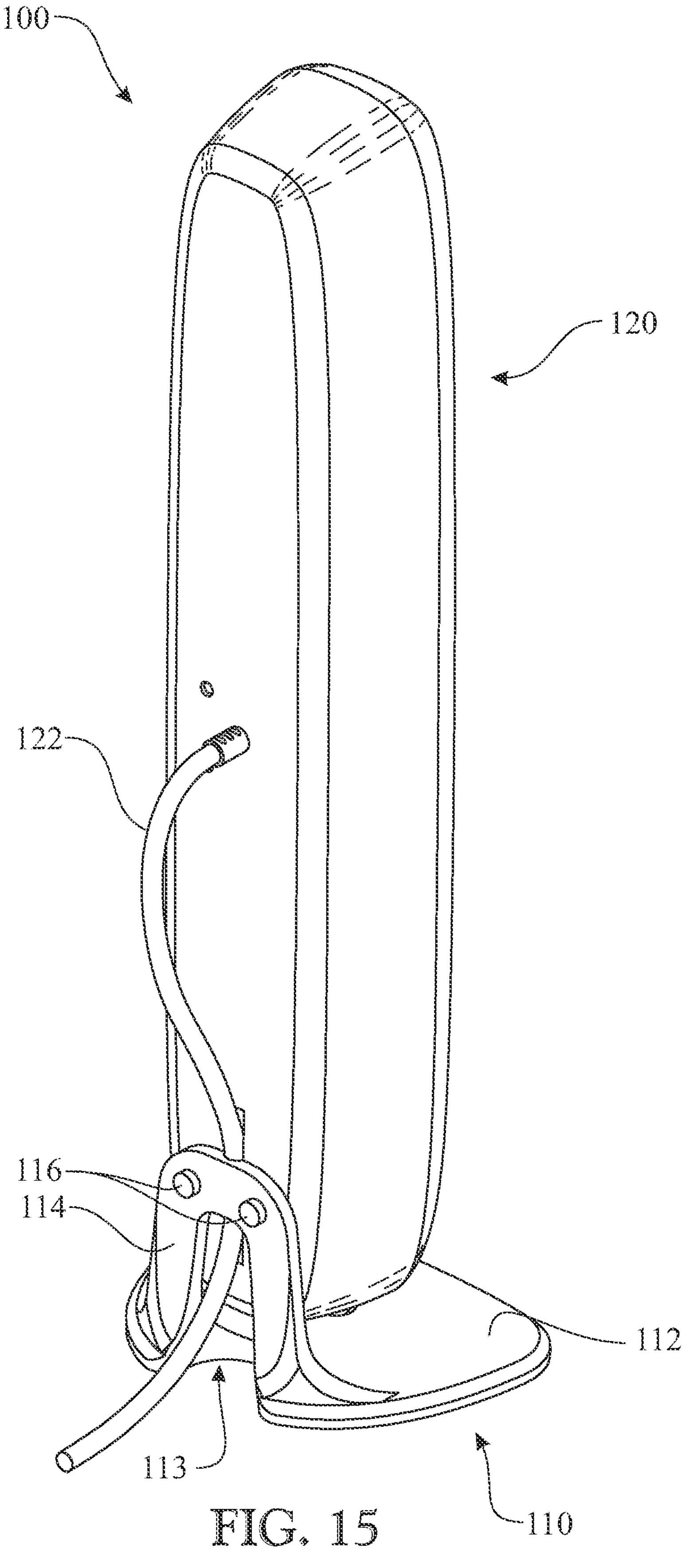
FIG. 15 presents a top, right rear view of the vertically oriented bar shaped light assembly with its attached support stand.

FIG. 10 provides a cross-sectional view of the light assembly 120 with the support stand 110 attached thereto and illustrates the mounting provisions including pem-nuts 124 for receiving a mounting screw 116 (not shown) and further illustrates a cord recess 142 formed in the rear wall 148 of the rear housing 140. Viewing FIGS. 11 and 13-15 in combination with FIG. 10, the support stand 110 maintains the light assembly 120 in a vertical orientation with the support base 112 of the support stand 110 resting on a horizontal surface. The cord recess 142 facilitates the passage of the power cord 122 between the rear housing 140 and the stand support 114 when the stand support 114 is affixed to the end holes 145 (FIG. 11) and as further illustrated in FIG. 13.

Figure 11:
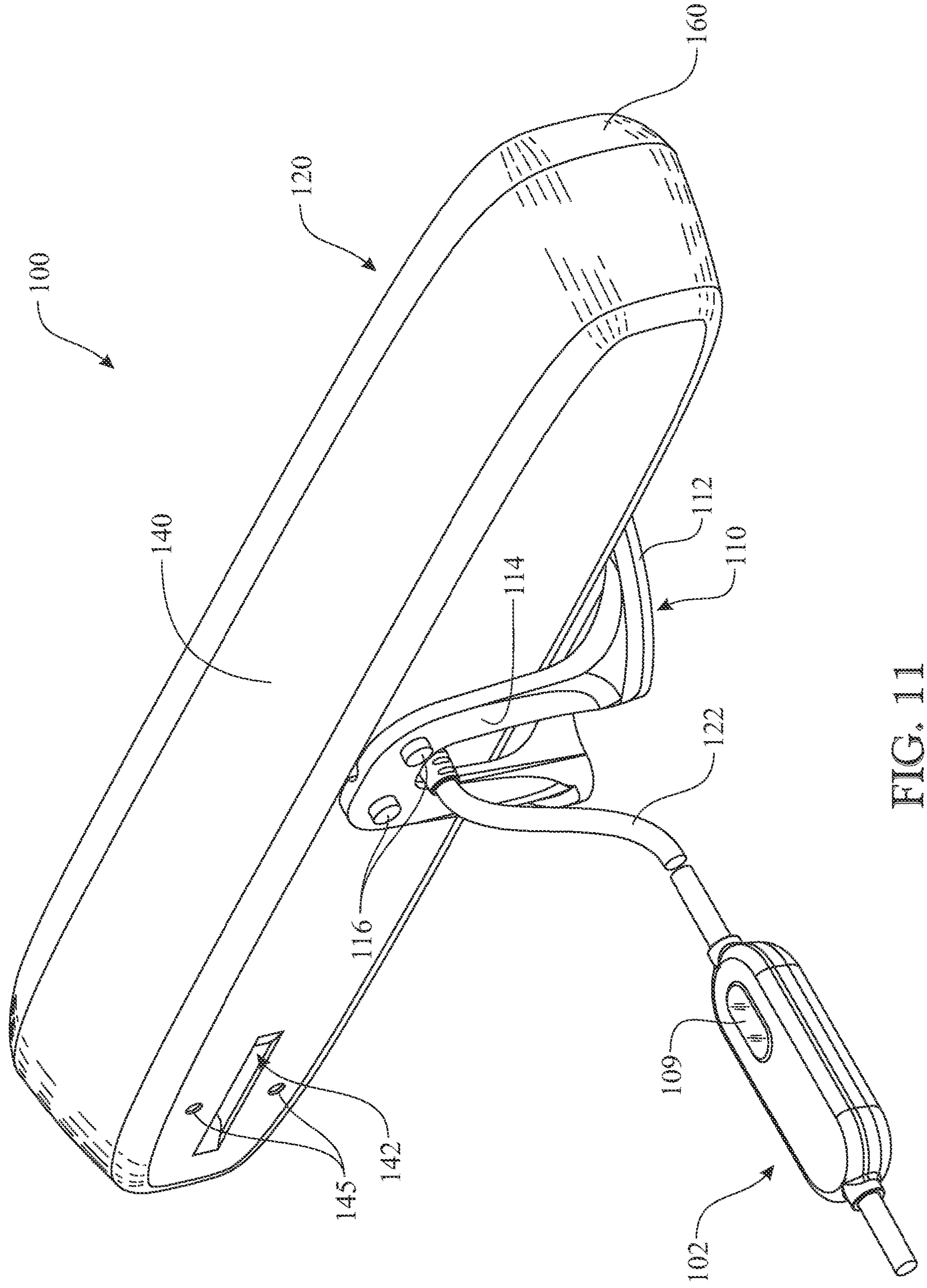
FIG. 11 presents an isometric top, right rear view of the horizontally oriented bar shaped light assembly with its attached support stand.
Figure 12:
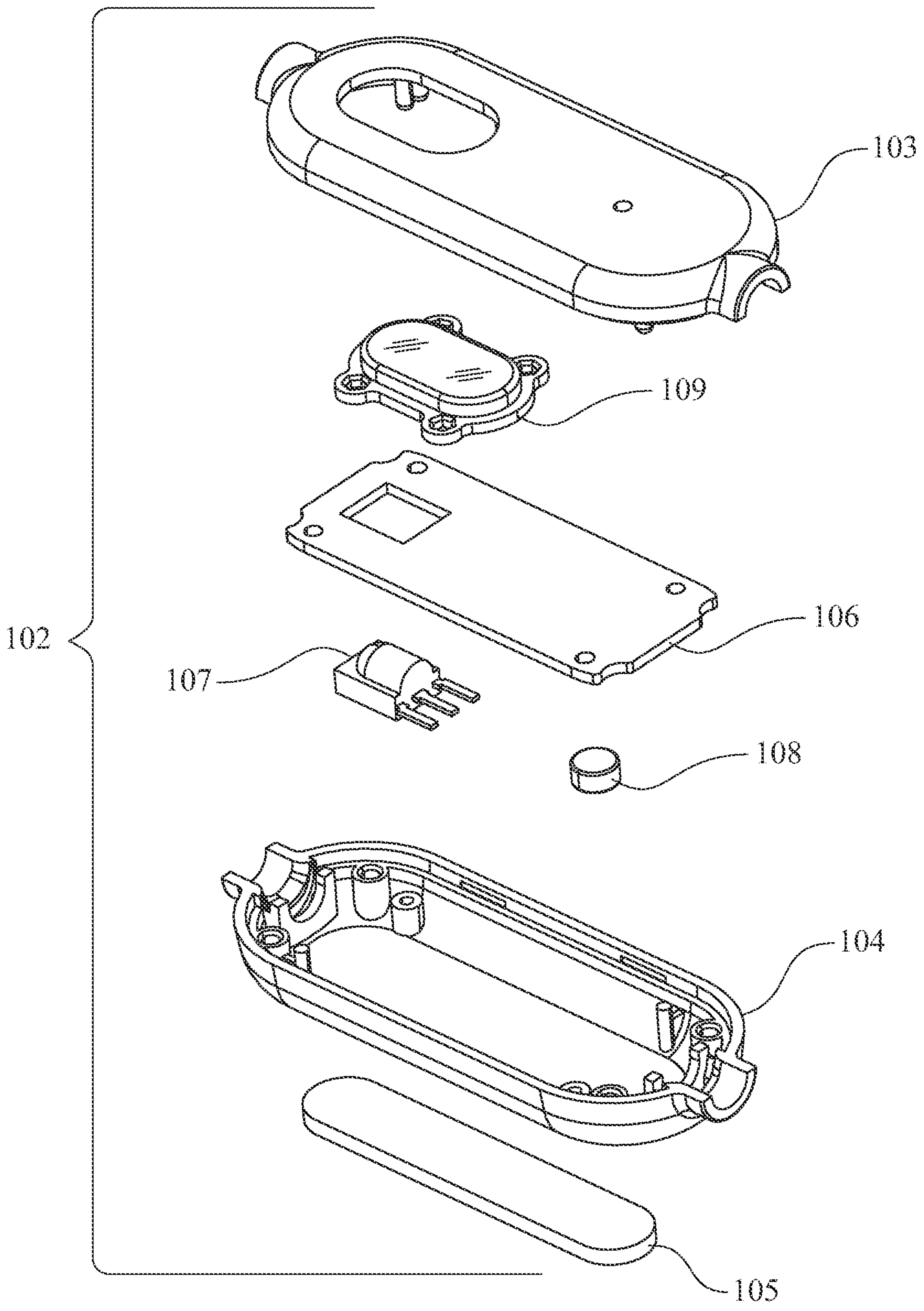
FIG. 12 presents an exploded view of the infrared receiver positioned along the power cord.
Figure 16:
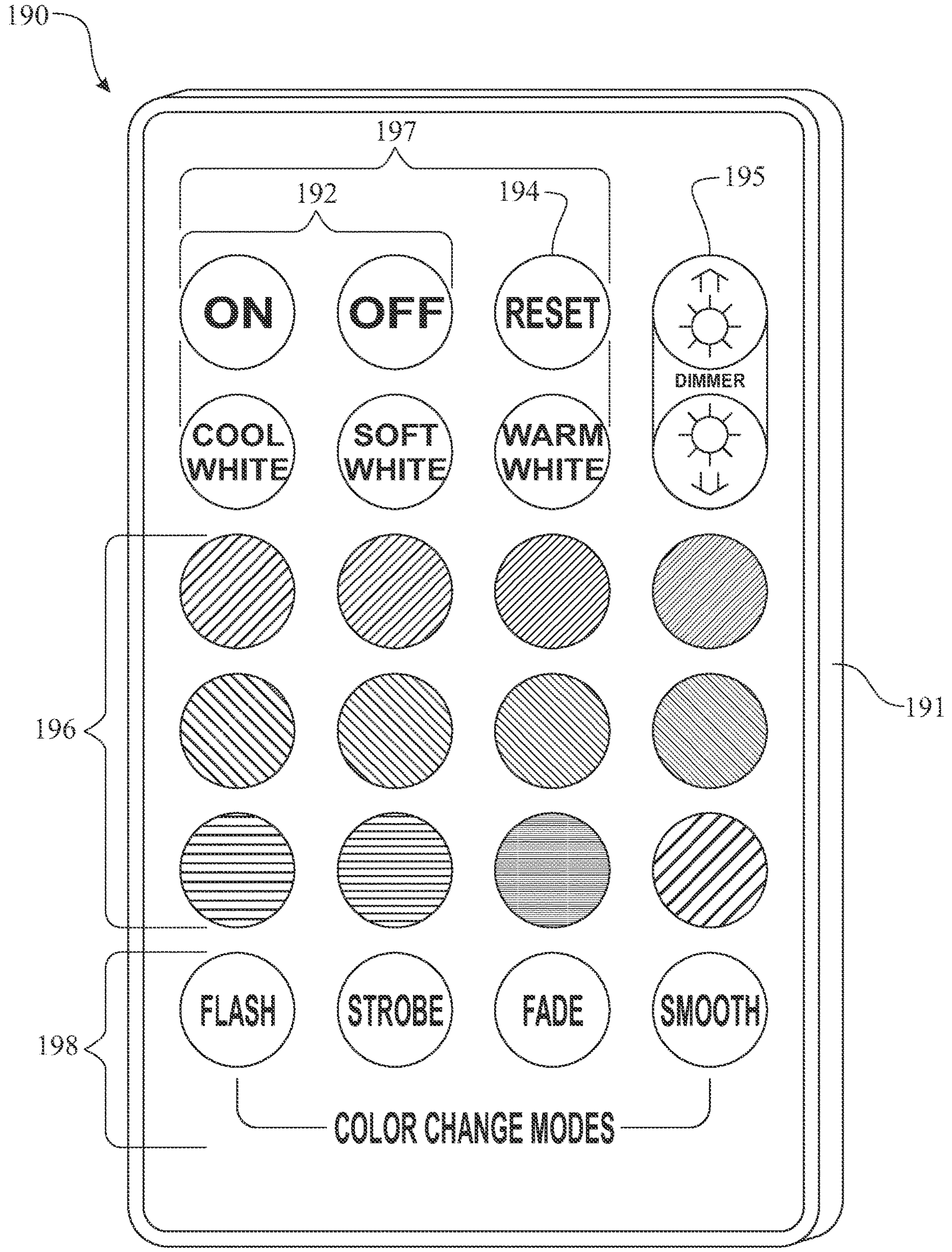
FIG. 16 presents a front plan view of the face of a remote control unit for controlling the bar shaped light assembly.

FIGS. 11-12 illustrate the incorporation of an infrared (IR) receiver 102 with the power cord 122. The power cord 122 typically is of a type having multiple leads contained therein and incorporates a USB connector to facilitate a connection with a computer so that the light assembly 100 can be controlled by a computer, a smart phone incorporating an appropriate application hosted thereon, or by using a dedicated IR remote 190 as illustrated in FIG. 16.

The IR receiver 102 is shown in an exploded view in FIG. 12 and comprises a lower shell 104 and an upper shell 103 and having housed therein a printed circuit assembly 106 having the appropriate circuitry thereon for controlling the various lighting modes of the light assembly 100. An IR detector 107 is positioned in conjunction with an IR lens 109 for the reception of IR signals from the IR remote control assembly 190. A battery 108 maintains the software resident on the printed circuit assembly 106.

The IR remote assembly 190 comprises a housing 191 with a plurality of user interface buttons thereon. Each button generates a unique IR signal to control different functions of the light assembly 100. Power control buttons 192 function to turn the light assembly 100 ON and OFF. Button 194 functions to reset the LEDs 184, 185 to a preset baseline lighting configuration. Button 195 functions to alternatively dim and brighten the light from the light assembly 100. Buttons 196 function to select one of a series of preset colors. Buttons 198 are sequential mode selection buttons to select such functions facilitating the LEDs to flash, strobe, fade, or smooth.

Alternatively, in lieu of an infra-red remote assembly 190 and the infra-red receiver 102, the desired remote control function can also be performed as a voice control function or also be controlled via Wi-fi.

In use, a user will configure the light assembly 100 for use either in a horizontal orientation by attaching the support stand 110 mounting holes 144 in the mid-area of the rear wall 148. Alternatively, if the user desires the light to be oriented vertically, the light assembly 120 will be attached to the support stand 110 utilizing mounting holes 145 at the end of the rear wall 148. The power cord 122 is received in the cord recess 142 proximate to the mounting holes 145. A further alternative is to mount the support stand 110 to a wall in a desired orientation by attaching the support base 112 to the wall through mounting hole 118. The power cord 122 is then plugged into a desired USB receptacle for providing power to the light assembly 100, and if connected to a USB receptacle on a computer for also providing control functions via the computer. The IR remote control assembly 190 can be utilized to control the various modes and functions of the light assembly 100 as described above.

The above description is considered that of certain embodiments of the present invention only. Modifications of the invention will occur to those skilled in the art and to those who make or use the invention. Therefore, it is understood that the embodiments described herein are merely for illustrative purposes only and are not intended to limit the scope of the invention hereof.

What is claimed is:

1. A multi-positional bar shaped light assembly comprising:

a rear housing defining an interior and an open front, the housing further having a rear wall defining two sets of mounting holes therethrough, a first set and a second set oriented at a right angle with respect to the first set;

a light emitting assembly having a plurality of multi-colored and white lights, the light emitting assembly positioned and mounted within the rear housing oriented to emit light through the open front of the rear housing; and a support stand affixed to the rear housing at one of the first and second sets of mounting holes.

2. The multi-positional bar shaped light according to claim 1 wherein the support stand includes a support base having a planar bottom surface and a stand support affixed to an opposite surface thereto, the support base and the stand support are arranged at right angles one to the other, the stand support further defining a set of holes in a pattern identical to the first and second set of mounting holes defined in the rear elongate housing.

3. The multi-positional bar shaped light according to claim 1 wherein the housing is horizontally oriented when the support stand is affixed to the elongate housing utilizing the first set of mounting holes.

4. The multi-positional bar shaped light according to claim 1 wherein the housing is vertically oriented when the support stand is affixed to the elongate housing using the second set of mounting holes.

5. The multi-positional bar shaped light according to claim 4 wherein the housing further defines a cord recess formed therein such that an electrical cord providing electrical power to the light assembly is received in the cord recess and positionally maintained in the cord recess by the stand support structure.

6. The multi-positional bar shaped light according to claim 1 wherein the stand support is affixed to the housing utilizing threaded fasteners.

7. The multi-positional bar shaped light according to claim 6 wherein the housing further includes nuts embedded in the housing structure and in line with the mounting holes for receiving the threaded fasteners to secure the elongate housing to the support stand.

8. The multi-positional bar shaped light according to claim 1 wherein the support base defines at least one hole therethrough, the hole for facilitating attachment of the support stand to a selected one of a vertical wall surface and a ceiling surface.

9. The multi-positional bar shaped light according to claim 1 wherein the stand support further defines an aperture therethrough for passage of an electrical cord providing electrical power to the light assembly.

10. A multi-positional bar shaped light assembly comprising:

a rear housing defining an interior and an open front, the housing further having a rear wall defining two sets of mounting holes therethrough, a first set and a second set oriented at a right angle with respect to the first set;

a printed circuit assembly positioned and mounted within the rear housing, the printed circuit assembly including a plurality of multi-colored and white lights arranged thereon and oriented to emit light through the open front of the rear housing;

an electrical power cord extending through the rear elongate housing at a midpoint thereof and electrically connected to the printed circuit assembly;

a translucent lens attached to the rear housing at the open front; and a support stand affixed to the rear housing at one of the first and second sets of mounting holes wherein the support stand includes a support base having a planar bottom surface and a stand support affixed to an opposite surface thereto, the support base and the stand support are arranged at right angles one to the other, the stand support further defining a set of holes in a pattern identical to the first and second set of mounting holes defined in the rear elongate housing.

11. The multi-positional bar shaped light according to claim 10 wherein the housing is horizontally oriented with respect to the support base when the support stand is affixed to the housing utilizing the first set of mounting holes.

12. The multi-positional bar shaped light according to claim 11 wherein the stand support further defines an aperture therethrough for passage of the electrical cord providing electrical power to the light assembly.

13. The multi-positional bar shaped light according to claim 10 wherein the housing is vertically oriented with respect to the support base when the support stand is affixed to the elongate housing using the second set of mounting holes.

14. The multi-positional bar shaped light according to claim 13 wherein the housing further defines a cord recess formed therein such that the electrical cord providing electrical power to the light assembly is received in the cord recess and positionally maintained in the cord recess by the stand support structure.

15. The multi-positional bar shaped light according to claim 10 wherein the stand support is affixed to the housing utilizing threaded fasteners.

16. The multi-positional bar shaped light according to claim 10 wherein the housing further includes nuts embedded in the housing structure and in line with the mounting holes for receiving the threaded fasteners to secure the housing to the support stand.

17. The multi-positional bar shaped light according to claim 10 wherein the support base defines at least one hole therethrough, the hole for facilitating attachment of the support stand to a selected one of a vertical wall surface and a ceiling surface.

18. A multi-positional bar shaped light assembly comprising:

a rear housing defining an interior and an open front, the housing further having a rear wall defining two sets of mounting holes therethrough, a first set and a second set oriented at a right angle with respect to the first set;

a printed circuit assembly positioned and mounted within the rear housing, the printed circuit assembly including a plurality of multi-colored and white lights arranged thereon and oriented to emit light through the open front of the rear housing;

an infra-red remote controller responsive to a user's inputs and emitting infra-red signals therefrom;

an electrical power cord extending through the rear housing and electrically connected to the printed circuit assembly, the electrical power cord further including at an intermediate location therealong an infra-red receiver for receiving the infra-red signals and communicative with the printed circuit assembly to control various lighting modes of the light assembly in response to the infra-red signals;

a translucent lens attached to the rear housing at the open front; and a support stand selectively affixed to the rear housing at one of the first and second sets of mounting holes wherein the support stand includes a support base having a planar bottom surface and a stand support affixed to an opposite surface thereto, the support base and the stand support are arranged at right angles one to the other, the rear housing when affixed to the support stand utilizing the first set of mounting holes assumes a first orientation and the rear housing when affixed to the support stand utilizing the second set of mounting holes assumes a second orientation at a right angle with respect to the first orientation.

19. The multi-positional bar shaped light according to claim 18 wherein the elongate housing further defines a cord recess formed between a first and a second mounting holes of the second set of mounting holes such that the electrical cord providing electrical power to the light assembly is received in the cord recess and positionally maintained in the cord recess by the stand support structure when the support stand is affixed to the rear housing utilizing the second set of mounting holes.

20. The multi-positional bar shaped light according to claim 18 wherein the support base defines at least one hole therethrough, the hole for facilitating attachment of the support stand to a selected one of a vertical wall surface and a ceiling surface.

* * * * *